United States Patent [19]

Staub

[11] 3,710,854
[45] Jan. 16, 1973

[54] CONDENSER

[75] Inventor: Fred W. Staub, Scotia, N.Y. 12302

[73] Assignee: General Electric Company, Schenectady, New York

[22] Filed: Feb. 17, 1971

[21] Appl. No.: 116,067

[52] U.S. Cl. ................165/111, 165/122, 165/146, 165/174
[51] Int. Cl. .............................................F28b 1/06
[58] Field of Search...............165/174, 111, 146, 122

[56] References Cited

UNITED STATES PATENTS

| | | | |
|---|---|---|---|
| 3,073,575 | 1/1963 | Schulenberg | 165/174 X |
| 2,874,555 | 2/1959 | Disinger et al. | 165/174 X |

Primary Examiner—Albert W. Davis, Jr.
Attorney—Paul A. Frank, John F. Ahern, Julius J. Zaskalicky, Frank L. Neuhauser, Oscar B. Waddell and Joseph B. Forman

[57] ABSTRACT

In a surface condenser of the upflow type including a plurality of parallel tubes arranged in a plurality of parallel rows between an inlet and an outlet manifold for condensing a vaporous medium by a stream of coolant, freeze-up of the tubes is prevented and improved performance is provided by selectively throttling the fluid flow from the tubes at the outlet ends thereof of all of the rows except the row adjacent the upstream end of the coolant flow stream.

7 Claims, 5 Drawing Figures

PATENTED JAN 16 1973
3,710,854
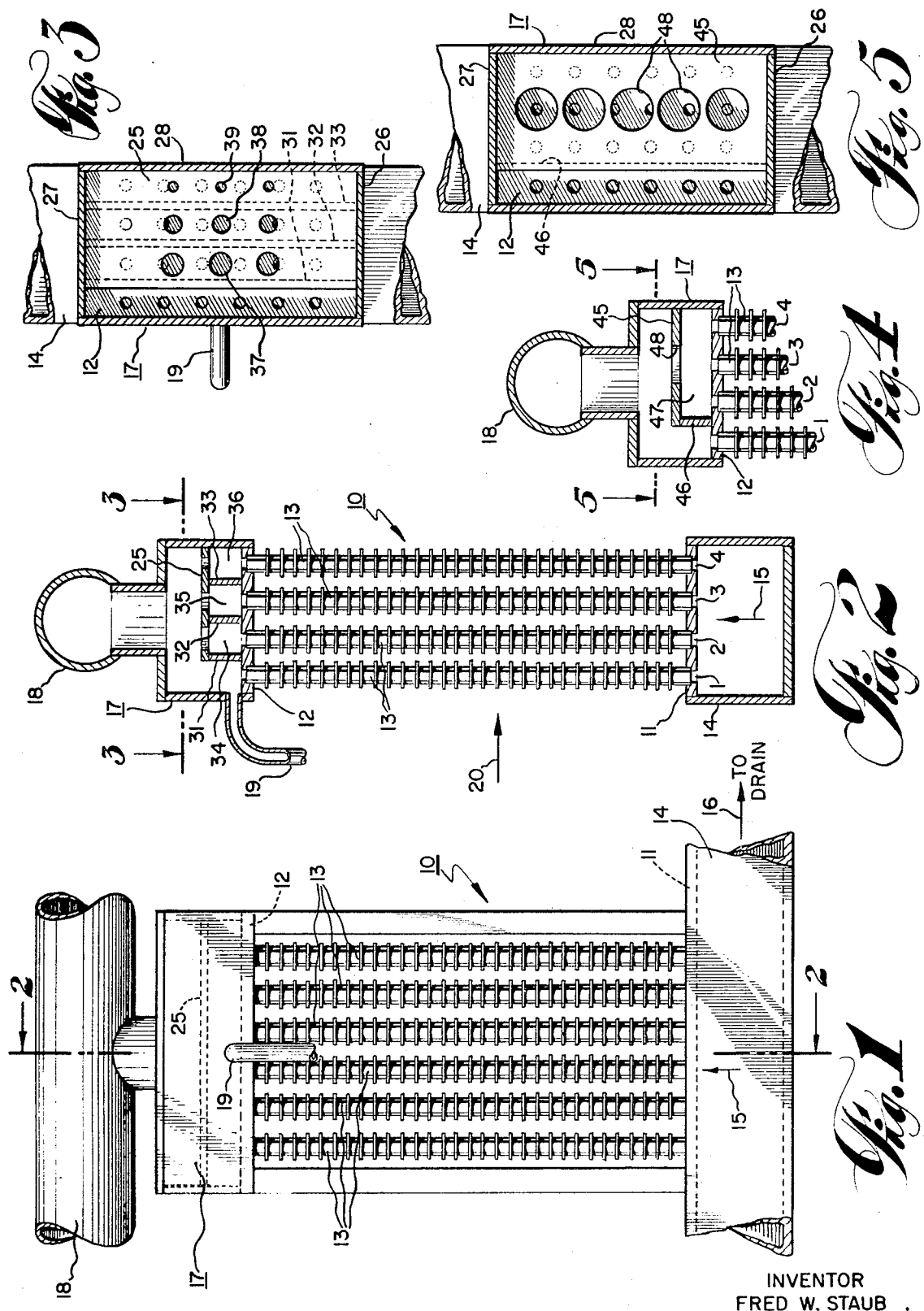
INVENTOR
FRED W. STAUB
BY
HIS ATTORNEY

CONDENSER

The present invention relates to condensers in general, and more particularly to a surface condenser of the upflow type for steam and similar vaporous media which is cooled by atmospheric air or other coolant whose temperature can be lower than the freezing temperature of the fluid being condensed.

Such a surface condenser includes a plurality of parallel tubes arranged in a plurality of parallel rows between an inlet and an outlet manifold. The air flow is perpendicular to the planes of the rows and the air is heated as it passes across the cooling surfaces of the tubes of the condenser. As a result, a lower condensing rate occurs in each successive row of tubes along the direction of flow of coolant with consequent lower pressure drop in successive rows of tubes. In upflow condensers with vapor flowing upward, condensate can flow upward as well. Since equal pressure drop must occur between the bottom or inlet manifold and the top or outlet manifold, condensate and vapor will normally pass through the tubes in the rows beyond the first row and enter the top of the tubes of the first row. Such flow paths inhibit flow in the tubes of the first row and traps air therein which further reduces condensing rates. Accordingly, condensate formed in the tubes or flowing therein from tubes in the rows beyond the first row freezes when the cooling air is sufficiently below the condensate freezing temperature. The flow phenomenon occurring in connection with the first row of tubes occurs in connection with tubes of the other rows but is not as significant as usually the cooling air impinging on those tubes would be above the freezing temperature of the condensate. Nevertheless such flow phenomenon will decrease the performance of some or all of the tubes in the various rows except the last row or two.

The present invention is directed to providing a condenser which avoids such freeze-up problems and which provides balanced coolant and vaporous medium flow through the condenser with resultant balanced heat transfer in the condenser.

Accordingly, an object of the present invention is to provide a condenser having balanced cooling and vaporous media flow therethrough.

Another object of the present invention is to provide a surface condenser which is highly efficient in condensing vaporous media.

A further object of the present invention is to provide a simple yet effective means to prevent and limit freeze-up of a surface condenser.

In accordance with an illustrative embodiment of the present invention, there is provided a surface condenser for condensing a stream of vaporous medium by a stream of coolant. There is provided an inlet manifold for inflow of the stream of vaporous medium and outlet manifold for outflow of products of the condensation process. A plurality of conductive tubes are connected in parallel between the inlet manifold and the outlet manifold. The tubes are arranged in a plurality of rows, the rows being adapted to be disposed in planes generally transverse or perpendicular to the direction of flow of the stream of coolant. The rows are consecutively numbered from the upstream end of the flow of coolant over the rows of tubes. A plurality of headers are mounted in the outlet manifold, each header encompasses the outlet ends of the tubes in a respective row except the first row. Each header is provided with a plurality of orifices. The orifices of each header are proportioned to provide the same pressure drop along the fluid flow paths in each of the rows of tubes whereby cross flows of condensation products between rows in the outlet manifold are minimized.

The novel features which are believed to be characteristic of the present invention are set forth in the appended claims.

The invention, itself, however, together with further objects and advantages thereof may best be understood by reference to the following description taken in connection with the accompanying drawings wherein:

FIG. 1 is a front view of a surface condenser assembly of the upflow type embodying the present invention.

FIG. 2 is a sectional view of the condenser assembly of FIG. 1 taken along section lines 2—2 of FIG. 1.

FIG. 3 is a sectional view of a portion of the apparatus of FIG. 2 taken along section lines 3—3 of FIG. 2.

FIG. 4 shows a modification of the outlet manifold of the condenser assembly of FIGS. 1 and 2.

FIG. 5 is a sectional view of FIG. 4 taken along section lines 5—5 of FIG. 4.

Referring now to FIGS. 1 and 2, there is shown a surface condenser assembly 10 of the upflow variety in which a vaporous medium such as steam is condensed by a stream of coolant such as air comprising a lower base plate 11 and an upper base plate 12 between which are mounted a plurality of condenser tubes 13. A supply or inlet manifold 14 is mounted to the lower base plate 11 to provide steam to the lower openings of the tubes as indicated by the arrow 15. The inlet manifold 14 in turn is supplied by a distribution conduit which may be an extension of the manifold 14 as shown. Condensate collected in the manifold 14 flows as indicated by the arrow 16 to a suitable drain point for reuse. An outlet or receiving manifold 17 is mounted to the upper base plate 12 to collect the upward flowing products of condensation which include gases, vapors, and liquids. The gaseous and vapor products are withdrawn by an evacuating device (not shown) such as an air ejector, connected to the conduit 18 which in turn is connected to the manifold 17. Also located in the outlet manifold 17 adjacent the upper base plate 12 is a duct 19 for removal of condensate flowing from the outlet ends of the tubes 13. A plurality of condenser assemblies such as shown in FIGS. 1 and 2 may be mounted in banks to obtain the cooling capacity need. Also, each of the condenser assemblies may be inclined to the vertical and cooling air may be directed over the external surfaces of the tubes 13 by convection, or by forced cooling by fans (not shown).

The tubes 13 are connected in a plurality of rows with the axes of each of the tubes in a row lying in a plane. The planes of each of the rows of tubes are parallel and disposed in a direction generally transverse or perpendicular to the direction of flow of coolant across the external surfaces of the condenser as indicated by the arrow 20. The rows of the tubes are consecutively numbered from 1 to 4 starting from the upstream end of the air flow stream.

A throttling structure is provided in the outlet manifold for throttling the flows through the tubes of all of the rows, except row 1, to equalize pressure drop in such rows to the pressure drop in the tubes of row 1 as well as for other reasons to be explained hereinafter. The throttling structure includes a plate 25 located above and parallel to the upper base plate 12. The plate extends from one short side 26 to the opposite short side 27 of the manifold 17 and from the downstream or long side 28 of the manifold to be positioned above the portion of the upper base plate 12 between row 1 and row 2. Three partitions 31, 32 and 33 are provided extending from the upper base plate to the plate to form three headers 34, 35 and 36 with the plate 25, each header encompassing a respective row of tubes 13. Header 34 encloses the outlet ends of the tubes of row 2. Header 35 encloses the outlet ends of the tubes of row 3. Header 36 encloses the outlet ends of the tube of row 4. The portion of the plate 25 opposite the outlet ends of the tubes of row 2 and hence header 34 is provided with three orifices 37, each orifice of the same diameter centrally located therein. Similarly, the portion of the plate 25 opposite the outlet ends of the tubes of row 3 and hence header 35 is provided with three orifices 38, each of the same diameter, centrally located therein. The diameter of the orifices 38 is smaller than the diameter of the orifices 37. Similarly, the portion of the plate opposite the outlet ends of the tubes of row 4 and hence header 36 is provided with three orifices 39, each of the same diameter, centrally located therein. The diameter of the orifices 39 is smaller than the diameter of the orifices 38.

As cooling air flows across the cooling surfaces of the tubes 13, rows of tubes become successively warmer. The cooling action of such successively warmed air is successively diminished with the result that succeeding rows of tubes have successively smaller pressure drops. In order to equalize the pressure drop in the tubes of all of the rows the successively higher numbered rows are provided with headers and orifices therein, in accordance with the present invention, which introduce successively higher pressure drops in the flow paths thereof. To this end the aggregate cross-sectional area of the orifices in a header is successively decreased with row number to provide the increased pressure drop. With the arrangement shown in FIGS. 2 and 3, cross flows from the tubes of rows 2, 3 and 4 to row 1 are minimized with resultant reduced risk of backflow through the tubes of row 1 and the entrapment of air therein. Each of the headers 34, 35 and 36 with orifices located therein, in addition to providing a means for equalizing the pressure in the flow paths of the tubes in the various rows also prevents the discharge of condensate into the outlet manifold 17. Also, the headers 34, 35 and 36 produce higher saturation pressure and consequently higher saturation temperature in the throttled tubes 13 of rows 2, 3 and 4 with consequent enhancement of the cooling efficiency of the condenser.

While the orifices for each of the headers of FIGS. 2 and 3 are shown to be of uniform diameter and centrally located, it will be understood that each of the headers 34, 35 and 36 may be provided with a larger number of orifices of smaller diameter or with a smaller number of orifices of larger diameter to provide essentially the same pressure drop as occurs in the tubes of the first row. Preferably, the number, size and distribution of orifices is set to provide good flow distribution through the tubes of a row. Of course, small orifices that are subject to excessive erosion damage or difficult to hold to manufacturing tolerances should be avoided.

Reference is now made to FIGS. 4 and 5 which show a modification of the structure of the outlet manifold 17 of the condenser apparatus of FIGS. 1, 2 and 3. The elements of FIGS. 4 and 5, identical to the elements of FIGS. 1, 2 and 3 are designated by the same numerals. The outlet manifold includes a plate 45 disposed in parallel above the base plate 12 and extending from one short side wall 27 to the opposite short side wall 28 thereof and also extending from the long or downstream side wall 28 inward to position opposite the portion of the upper base plate located between the tubes 13 of row 1 and row 2. An end wall 46 is provided between the upper base plate 12 and the plate 45 and extending from one side wall 26 to the other side wall 27 to form a header 47 encompassing the outlet ends of the tubes of rows 2, 3 and 4. The plate 45 is provided with five orifices 48 each of the same diameter and uniformly spaced on the plate between the side walls 26 and 27. The aggregate cross-sectional area of the orifices 48 is arranged so that the pressure drop through the three rows of tubes to the outlet ends of the orifices 48 is substantially the same as the pressure drop through the tubes of row 1. The operation of the throttling structure of FIGS. 4 and 5 is similar to the operation of the throttling structure of FIGS. 1, 2 and 3. The throttling structure provides an additional pressure drop in the tubes of rows 2, 3 and 4 to equalize the total pressure drop in the flow through rows 2, 3 and 4 to that existing in the tubes of row 1. As in the condenser of FIGS. 1, 2 and 3, increased pressure in the tubes of rows 2, 3 and 4 raises the saturation temperature of the stream therein and consequently provides more efficient cooling of such rows by the warmed cooling air from the tubes of row 1. The single header 47 also functions to prevent the discharge of condensate into the outlet manifold and into the tubes of row 1.

It will be recognized that the aggregate cross-sectional area of the orifices may be increased to assure removal of noncondensibles present in the incoming vapor in each row or may be decreased to allow only enough of the uncondensed vapor flow through the orifices to stay within the capacity of ejectors connected to the conduit for removal of such uncondensed vapor. If desired and needed, condensate drains may be provided in each of the headers of FIGS. 3, 4 and 5.

While my invention has been described in specific embodiments, it will be appreciated that modifications may be made by those skilled in the art and I intend by the appended claims to cover all such modifications and changes as fall within the true spirit and scope of my invention.

What I claim as new and desire to secure by Letters Patent of the United States is:

1. In combination, in an upflow surface condenser for condensing a stream of vaporous medium by a stream of coolant, an inlet manifold for ingress of said stream of vaporous medium, an outlet manifold for egress of said vaporous medium, a plurality of condenser tubes connected in parallel between said manifolds for passing said vaporous medium from said inlet manifold to said outlet manifold, said tubes being arranged in a plurality of rows, said rows being adapted to be disposed in planes generally transverse to the direction of flow of said stream of coolant, said rows being consecutively numbered from the upstream end of the flow of said stream of coolant over said rows of tubes, a plurality of headers mounted in said outlet manifold, each header encompassing the outlet ends of the tubes in a respective row, each header having a plurality of orifices, the orifices of each header being proportioned to provide substantially the same pressure drop along the fluid flow paths in each of the rows of tubes.

2. The combination of claim 1 in which the orifices in a header are the same size.

3. The combination of claim 2 in which the orifices in a header are uniformly distributed along the length of the header.

4. The combination of claim 2 in which total orifice area decreases with increasing row number.

5. The combination of claim 1 in which an additional row of tubes is provided adjacent to and parallel to the first numbered row in the flow stream of the coolant and connected between the inlet manifold and the outlet manifold.

6. In combination, in an upflow surface condenser for condensing a stream of vaporous medium by a stream of coolant, an inlet manifold for ingress of said stream of vaporous medium, an outlet manifold for egress of said vaporous medium, a plurality of condenser tubes connected in parallel between said manifolds for passing said vaporous medium from said inlet manifold to said outlet manifold, said tubes being arranged in a pair of rows, said rows being adapted to be disposed in planes generally transverse to the direction of flow of said stream of coolant, a header mounted in said outlet manifold encompassing the outlet ends of the tubes in the row of tubes adjacent the downstream end of said stream of coolant, said header having a plurality of orifices, the orifices of the header being proportional to provide the same pressure drop along the fluid flow path of the row of tubes adjacent the downstream end of said stream of coolant as in the row adjacent the upstream end of said stream of coolant.

7. In combination, in an upflow surface condenser for condensing a stream of vaporous medium by a stream of coolant, an inlet manifold for ingress of said stream of vaporous medium, an outlet manifold for egress of said vaporous medium, a plurality of condenser tubes connected in parallel between said manifolds for passing said vaporous medium from said inlet manifold to said outlet manifold, said tubes being arranged in a plurality of rows, said rows being adapted to be disposed in planes generally transverse to the direction of flow of said stream of coolant, said rows being consecutively numbered from the upstream end of the flow of said stream of coolant over said rows of tubes, a header mounted in said outlet manifold, said header encompassing the outlet ends of the tubes in all of the rows except the first row, said header having a plurality of orifices, the orifices being proportional to provide the same pressure drop along the fluid flow paths between inlet and outlet manifold in the tubes in all of the rows except the first.

* * * * *